United States Patent
Wang et al.

(10) Patent No.: US 11,710,003 B2
(45) Date of Patent: Jul. 25, 2023

(54) INFORMATION CONVERSION METHOD AND APPARATUS, STORAGE MEDIUM, AND ELECTRONIC DEVICE

(71) Applicant: TENCENT TECHNOLOGY (SHENZHEN) COMPANY LIMITED, Shenzhen (CN)

(72) Inventors: Mingxuan Wang, Shenzhen (CN); Jun Xie, Shenzhen (CN); Jian Yao, Shenzhen (CN); Jiangquan Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 219 days.

(21) Appl. No.: 16/890,861

(22) Filed: Jun. 2, 2020

(65) Prior Publication Data
US 2020/0293724 A1 Sep. 17, 2020

Related U.S. Application Data

(63) Continuation of application No. PCT/CN2019/075237, filed on Feb. 15, 2019.

(30) Foreign Application Priority Data

Feb. 26, 2018 (CN) .......................... 201810159460.7

(51) Int. Cl.
*G06F 40/00* (2020.01)
*G06F 40/58* (2020.01)

(52) U.S. Cl.
CPC .................................... *G06F 40/58* (2020.01)

(58) Field of Classification Search
CPC ................. G06F 40/126; G06F 40/151; G06F 40/40–58; G10L 21/06
See application file for complete search history.

(56) References Cited

U.S. PATENT DOCUMENTS

| 5,787,386 A * | 7/1998 | Kaplan | G06F 40/40 707/999.005 |
| 6,278,967 B1 * | 8/2001 | Akers | G06F 40/211 704/7 |

(Continued)

FOREIGN PATENT DOCUMENTS

| CN | 103092830 A | 5/2013 |
| CN | 2953065 A2 | 12/2015 |

(Continued)

OTHER PUBLICATIONS

International Search Report Issued in Application PCT/CN2019/075237 dated May 15, 2019, with English Machine Translation (6 pages).

(Continued)

*Primary Examiner* — Andrew C Flanders
*Assistant Examiner* — Parker Mayfield
(74) *Attorney, Agent, or Firm* — ArentFox Schiff LLP

(57) ABSTRACT

Embodiments of this application include an information conversion method for translating source information. The source information is encoded to obtain a first code. A preset conversion condition is obtained. The preset conversion condition indicates a mapping relationship between the source information and a conversion result. The first code is decoded according to the source information, the preset conversion condition, and translated information to obtain target information. The target information and the source information are in different languages. Further, the translated information includes a word obtained through conversion of the source information into a language of the target information.

17 Claims, 3 Drawing Sheets

(56) References Cited

U.S. PATENT DOCUMENTS

| | | | | |
|---|---|---|---|---|
| 2012/0316862 | A1* | 12/2012 | Sultan | G06F 40/53 |
| | | | | 704/4 |
| 2015/0356401 | A1 | 12/2015 | Vinyals et al. | |
| 2017/0031901 | A1* | 2/2017 | Song | G06F 40/44 |
| 2017/0139905 | A1 | 5/2017 | Na | |
| 2020/0034435 | A1* | 1/2020 | Norouzi | G06N 3/045 |

FOREIGN PATENT DOCUMENTS

| | | | |
|---|---|---|---|
| CN | 105159890 | A | 12/2015 |
| CN | 105183720 | A | 12/2015 |
| CN | 107239446 | A | 10/2017 |
| CN | 107357789 | A | 11/2017 |
| CN | 107368475 | A | 11/2017 |
| CN | 107368476 | A | 11/2017 |
| CN | 108388549 | A | 8/2018 |
| CN | 107545903 | A | 10/2018 |
| EP | 2953065 | A2 * | 12/2015 ............ G06F 17/28 |
| WO | WO2019019916 | A1 | 1/2019 |

OTHER PUBLICATIONS

Written Opinion Issued in Application PCT/CN2019/075237 dated May 15, 2019 (4 pages).
Chinese Office Action Issued in Application 201810159460.7 dated Dec. 27, 2019, with concise English Translation (9 pages).
Chinese Office Action Issued in Application 201810159460.7 dated Dec. 27, 2019, with concise English Translation (6 pages).
Gul Khan Safi Qamas et al., "Research on the Algorithm of Named Entity Recognition Based on Deep Neural Network", pp. 29-35, vol. 17, No. 10, with English Abstract, Oct. 10, 2017 (7 pages).
Chaochao Wang et al., "Translation Similarity Model Bard on Bilingual Compositional Semantics", University of Beijing Acta Scientarum Naturalium Universitatis Pekinensis, pp. 335-341, vol. 51, No. 2, with English Abstract, Mar. 2015 (7 pages).

* cited by examiner

INFORMATION CONVERSION METHOD AND APPARATUS, STORAGE MEDIUM, AND ELECTRONIC DEVICE

RELATED APPLICATION

This application is a continuation of International Application No. PCT/CN2019/075237, filed on Feb. 15, 2019, which claims priority to Chinese Patent Application No. 201810159460.7, filed on Feb. 26, 2018, and entitled "INFORMATION CONVERSION METHOD AND APPARATUS, STORAGE MEDIUM, AND ELECTRONIC DEVICE". The entire disclosures of the prior applications are hereby incorporated by reference in their entirety.

FIELD OF THE TECHNOLOGY

Embodiments of this application relate to the field of data processing.

BACKGROUND OF THE DISCLOSURE

Information conversion refers to a process of converting one kind of information into another kind of information on the basis of ensuring that an original meaning is not changed, that is, converting source information into target information through information conversion technology. At present, commonly used information conversion technologies include: machine translation, for example, traditional statistical machine translation (SMT) and neural machine translation (NMT). In the process of information conversion through NMT, the input source information is usually encoded into a vector or a vector sequence, and then the target information is generated word by word based on the vector or the vector sequence obtained through encoding.

However, in the process of information conversion in the foregoing manner, a neural network model that has been trained is often used. If a conversion result needs to be adjusted, a training object needs to be reacquired, and the neural network model is trained again. In other words, the information conversion method provided by the related art has a problem of poor flexibility in information conversion due to a difficulty in using external resources and inability to add a new mapping relationship within a time required for information conversion during the information conversion.

For the foregoing problems, no effective solution has been proposed yet.

SUMMARY

Embodiments of this application include an information conversion method and apparatus, a non-transitory computer-readable storage medium, and an electronic device, to resolve at least one technical problem of poor flexibility in information conversion based on a neural network.

According to one aspect of the embodiments of this application, an information conversion method for translating source information is provided. The source information is encoded to obtain a first code. A preset conversion condition is obtained. The preset conversion condition indicates a mapping relationship between the source information and a conversion result. The first code is decoded according to the source information, the preset conversion condition, and translated information to obtain target information. The target information and the source information are in different languages. Further, the translated information includes words obtained through conversion of the source information into a language of the target information.

According to another aspect of the embodiments of this application, an information conversion apparatus including processing circuitry is further provided. The processing circuitry is configured to encode source information to obtain a first code and obtain a preset conversion condition. The preset conversion condition indicates a mapping relationship between the source information and a conversion result. The processing circuitry is configured to decode the first code according to the source information, the preset conversion condition, and translated information to obtain target information. The target information and the source information are in different languages. Further, the translated information includes words obtained through conversion of the source information into a language of the target information.

According to one aspect of the embodiments of this application, a non-transitory computer-readable storage medium is further provided, the storage medium which when executed by a processor cause the processor to encode source information to obtain a first code and obtain a preset conversion condition. The preset conversion condition indicating a mapping relationship between the source information and a conversion result. The first code is decoded according to the source information, the preset conversion condition, and translated information to obtain target information. The target information and the source information are in different languages. Further, the translated information includes words obtained through conversion of the source information into a language of the target information.

According to one aspect of the embodiments of this application, an electronic device is further provided, including a memory and a processor, the memory storing a computer program, and the processor being configured to perform the method through the computer program.

In the embodiment of this application, the source information is converted by adding a conversion condition, the conversion condition can make the machine translation more flexible, and the conversion result is made more accurate through the conversion condition, thereby resolving the technical problem of poor flexibility of information conversion based on a neural network.

BRIEF DESCRIPTION OF THE DRAWINGS

Accompanying drawings described herein are used to provide further understanding about the embodiments of this application, and constitute examples of the embodiments of this application; and schematic embodiments of this application and their description are used to explain this application, and do not constitute a limitation on the scope of this application. In the figures.

DESCRIPTION OF EMBODIMENTS

To enable a person skilled in the art to better understand the solutions of the embodiments of this application, the technical solutions of the embodiments of this application will be described below with reference to the accompanying drawings of the embodiments of this application. The described embodiments are merely some but not all of the embodiments of this application. All other embodiments obtained by persons skilled in the art based on the embodiments of this application shall fall within the protection scope of the embodiments of this application.

In the specification, claims, and accompanying drawings of this application, the terms "first", "second", and so on are intended to distinguish between similar objects rather than indicating a specific order. The data termed in such a way are interchangeable in proper circumstances, so that the embodiments of this application described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Figure 1:
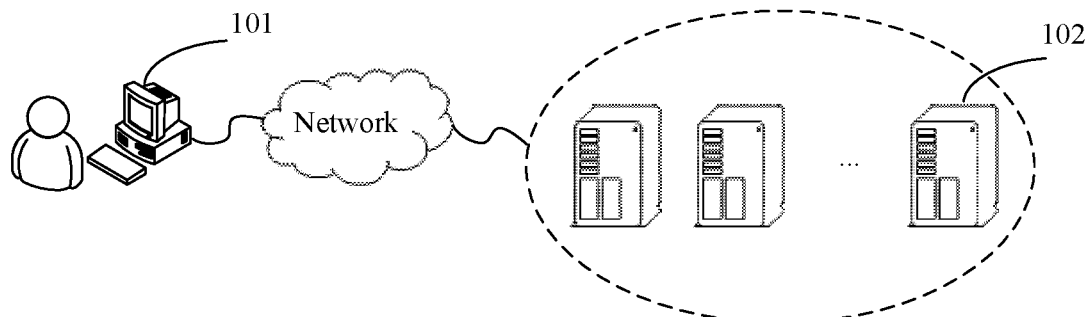
FIG. 1 is a schematic diagram of a hardware environment according to an embodiment of this application.

According to one aspect of the embodiments of this application, an information conversion method is provided. In this embodiment, the foregoing information conversion method may be applied to a hardware environment composed of a terminal 101 and a server 102 as shown in FIG. 1. As shown in FIG. 1, the terminal 101 is connected to the server 102 through a network. The network includes but is not limited to: a wide area network, a metropolitan area network, or a local area network. The terminal 101 may be a mobile terminal, or may be a PC terminal, a notebook terminal, or a tablet terminal.

The information conversion method may be applied to the server 102 or the terminal 101. Generally, a conversion interface may be displayed on the terminal 101. The terminal 101 sends to-be-converted source information received through the conversion interface to the server 102. The server 102 converts the to-be-converted source information and returns a conversion result to the terminal 101, and a conversion result is displayed on the conversion interface of the terminal 101. The conversion interface may receive text information, voice information, or the like. The received voice information may be automatically converted into text and converted into target information as source information.

Figure 2:
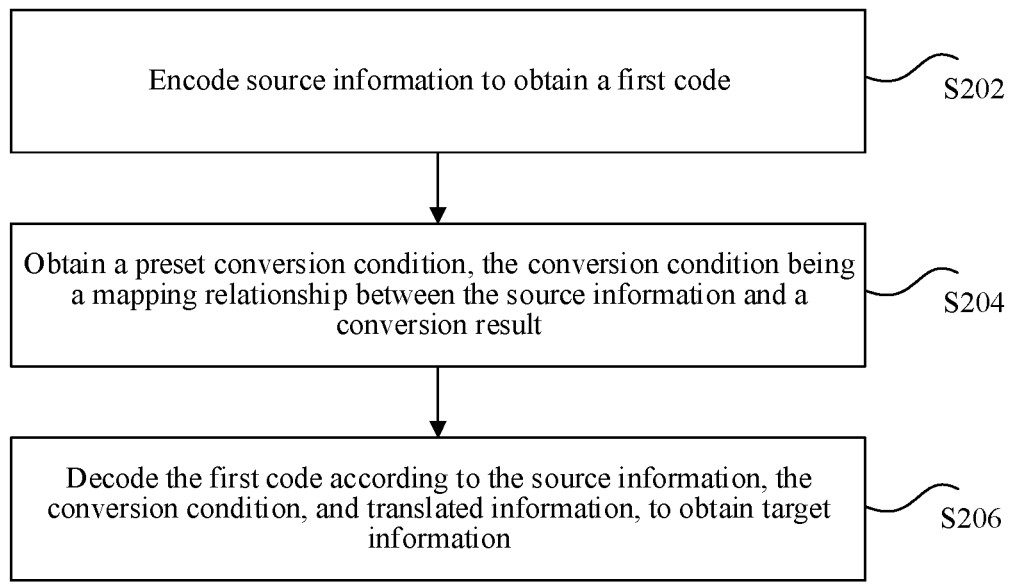
FIG. 2 is a flowchart of an information conversion method according to an embodiment of this application.

FIG. 2 is a flowchart of an information conversion method according to an embodiment of this application. For example, a server performs the information conversion method below. As shown in FIG. 2, the information conversion method can include the following steps.

In step S202, the server encodes source information to obtain a first code.

The server encodes the source information by using an encoder of a neural network to obtain the first code, the first code being a first vector. That is, the encoder of the neural network is configured to encode the source information into a set of vectors for representation.

In step S204, the server obtains a preset conversion condition. The conversion condition can be a mapping relationship between the source information and a conversion result.

The preset conversion condition may be a plurality of pieces of discontinuous information, the discontinuous information being used for indicating that a phrase includes at least two discontinuous parts with associations. For example, as a conversion condition, "an association with . . . " is discontinuous information, including "an" and "association", which are two discontinuous parts with associations. For example, let . . . go . . . take . . . is also a piece of discontinuous information, which may be used as a conversion condition, including the three associated but discontinuous parts of "let", "go" and "take".

The encoder of the neural network may also convert the source information without the conversion condition. However, target information obtained through conversion without using the conversion condition may be different from target information obtained through conversion by using the conversion condition. For example, the preset conversion condition is: "X and Y have a relationship->X has a relationship with Y", where X and Y are variables and may be any segment. For example, "Beijing and Shanghai have a relationship" may be converted into "Beijing has a relationship with Shanghai" using this rule. However, when the rule is not used, "Beijing and Shanghai have a relationship" may be converted into "there is a relationship between Beijing and Shanghai".

In other words, neural machine translation may also convert source information into target information according to logic without using the foregoing conversion condition. However, in order to make the conversion more accurate or make the converted information conform to the context and semantics of the source information, the conversion result may be made more accurate by adding the conversion condition.

For example, the word communication usually means an act of communicating. In the field of communication, the word is converted into correspondence and transmission. In the field of source information data communication, the neural machine translation may convert, according to the preset conversion condition, a phrase related to the word into a phrase of the communication field during the conversion, so that the conversion result is more accurate. The conversion may be language translation.

In step S206, the server decodes the first code according to the source information, the conversion condition, and translated information to obtain target information. The target information and the source information can be information in different languages. The translated information can be a word obtained through conversion of the source information. A language of the translated information can be the same as a language of the target information.

The source information may be Chinese, English, Japanese, Korean, Portuguese, Arabic and the like, and the target information may be Chinese, English, Japanese, Korean, Portuguese, Arabic and the like. The source information is converted into the target information in forms including but not limited to the following forms: Chinese is converted to any one of English, Japanese, Korean, Portuguese, and Arabic; English is converted to any one of Chinese, Japanese, Korean, Portuguese, and Arabic; Japanese is converted to any one of Chinese, English, Korean, Portuguese, and Arabic; Korean is converted to any one of Chinese, English, Japanese, Portuguese, and Arabic; Portuguese is converted to any one of Chinese, English, Japanese, Korean, and Arabic; and Arabic is converted to any one of Chinese, English, Japanese, Korean, and Portuguese. Other languages are converted in the same form as above, and the source information is converted into the target information of different languages, which are not individually described by using examples.

The process of converting source information into target information is a word-by-word conversion. The translated information is the word that is obtained through conversion of the source information and is a part of the source information that has been converted. Therefore, the language of the translated information is the same as the language of the target information.

The first vector is decoded according to the source information, the conversion condition, and the translated information by using a decoder of the neural network, to obtain target information, where the conversion condition is obtained in advance by the decoder of the neural network. That is, in the decoding process of the decoder of the neural network, the conversion condition is first obtained, and the first vector is decoded by combining the conversion condition, the source information, and the translated information. The conversion condition, translated information, and source information that are used for performing decoding are all in the form of vectors. The source information may be encoded into a vector through the encoder of the neural network. When the conversion condition is integrated into the neural machine conversion, the conversion condition needs to be encoded, which may be expressed in the form of continuous vectors. Generally, a recursive neural network may be used for encoding. However, the variable in the conversion condition may be treated as a general character for processing. These variables do not need special processing into special characters, and are encoded as vectors as general characters.

In this embodiment, the source information is converted by adding a conversion condition, the conversion condition can make the machine translation more flexible, and the conversion result is made more accurate through the conversion condition, thereby resolving the technical problem of poor flexibility of information conversion based on a neural network and achieving a technical effect of improving flexibility and accuracy.

Figure 3:
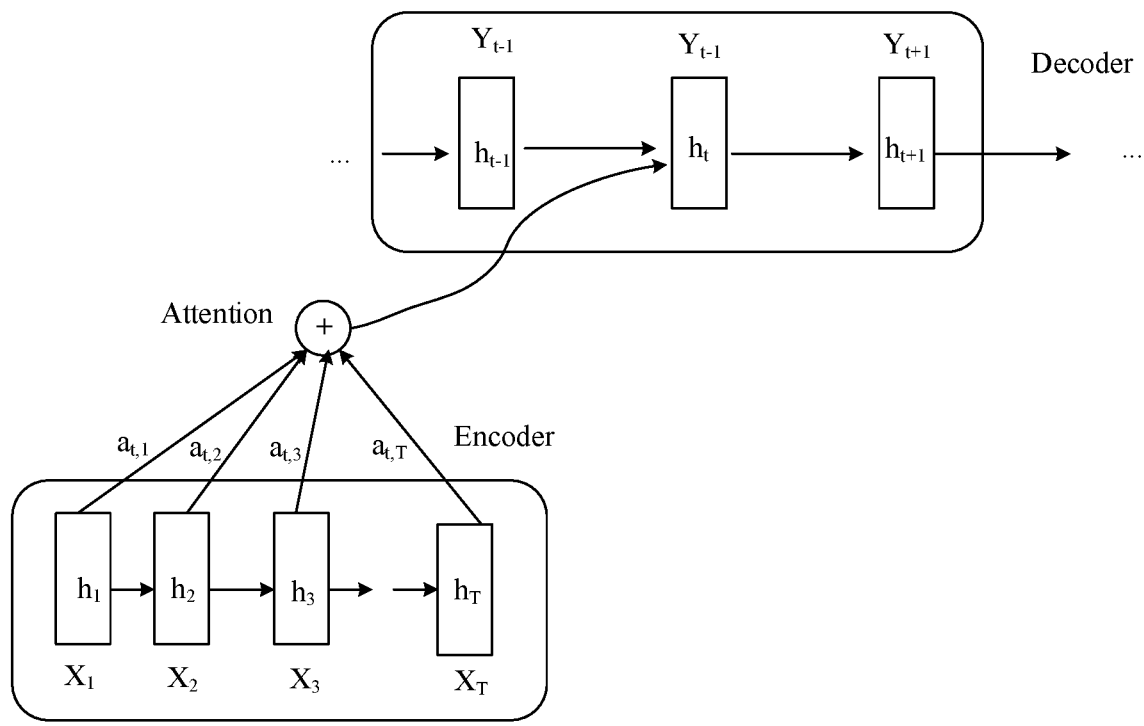
FIG. 3 is a schematic diagram of a decoder and an encoder of a neural network according to an embodiment of this application.

An exemplary model for the neural machine translation is shown in FIG. 3, mainly including three modules.

(1) An encoder of a neural network encodes an input sentence as source information into a set of fixed vectors.

(2) A decoder of the neural network decodes an encoding result of the source information and generates a conversion result of target information step by step.

(3) A focusing mechanism, when decoding is performed, focuses attention on a source information segment most relevant to the current target information through the focusing mechanism.

Figure 4:
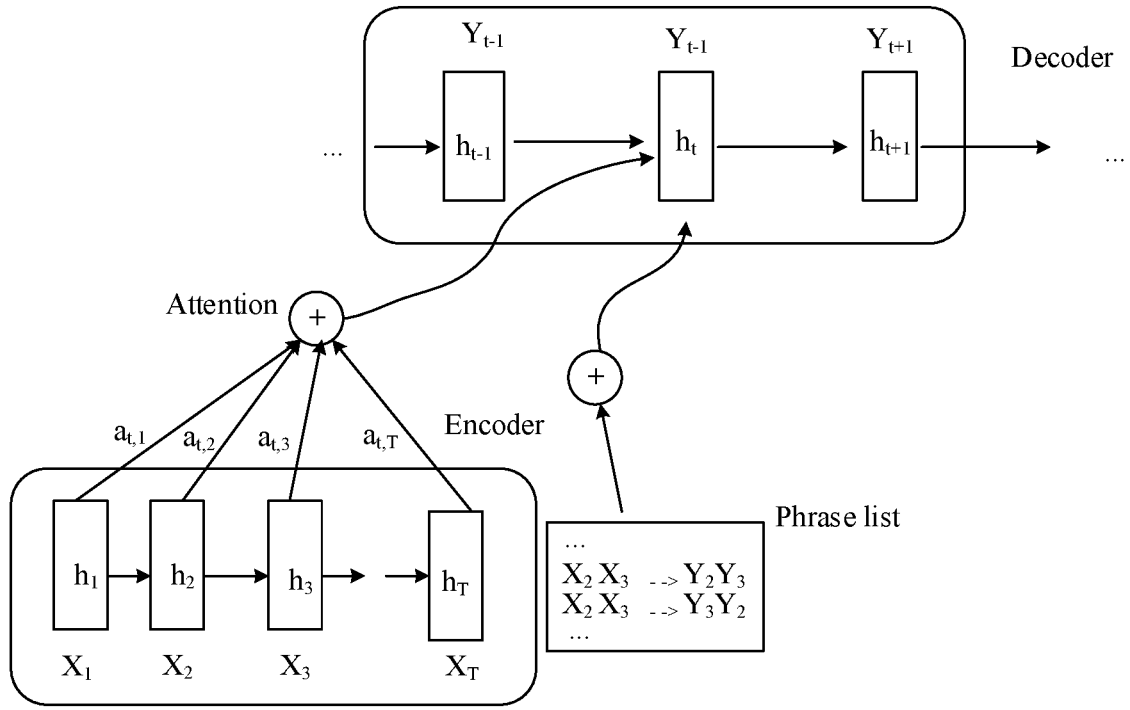
FIG. 4 is a schematic diagram of a neural network model according to an exemplary embodiment of this application.

In this embodiment, the step of conversion using the conversion condition is performed in the decoder of the neural network. Exemplary model is shown in FIG. 4. The phrase list in FIG. 4 may include the foregoing preset conversion condition.

Optionally, the decoding the first code according to the source information, the conversion condition, and translated information, to obtain target information includes: determining a similarity in sentence patterns between a plurality of preset conditions and the source information according to the source information and the translated information; using a condition with a highest similarity in the plurality of conditions as the conversion condition; and decoding the first code according to the source information, the conversion condition, and the translated information, to obtain the target information.

A dictionary is input into the neural network. The dictionary includes a plurality of conditions such as discontinuous information and the like, and generally, there is a relatively large quantity of conditions. In the current conversion, all the conditions in the dictionary are not required, but some are selected for use from the majority of conditions in the dictionary. In this way, a condition required for the current conversion needs to be screened out from the large number of conditions in the dictionary, that is, a condition matching the current source information. For example, when a sentence "Beijing and Australia are related" is converted, a condition "X and Y are related" may be matched and left behind, but a condition "X defeats Y" is filtered out, so that conditions corresponding to each sentence are relatively limited. That is, a condition that is most similar to the source information in sentence patterns is found from a plurality of conditions as a conversion condition, to use the conversion condition in the current conversion.

Further, during decoding, the conditions in the dictionary are input to the decoder of the neural network, and the decoder dynamically selects the conversion conditions to be used through the focusing mechanism. The decoder selects the condition with a largest weight value as the conversion condition by obtaining a weight value of each condition. In the process of obtaining the weight value by the decoder of the neural network, the focusing mechanism is used. The focusing mechanism is to focus attention on source information most relevant to the current target information. For example, content most relevant to the current target information includes words (e.g., translated information) that have been converted before the current target information, source information and conditions that are related to the current target information. When the weight value is obtained, the weight value of each condition is determined according to the foregoing relevant source information, condition, and translated information. For example, the determining a similarity in sentence patterns between a plurality of preset conditions and the source information according to the source information and the translated information includes: determining a weight value of a first condition in the plurality of conditions according to a first vector for representing the source information, a second vector for representing the translated information, and a third vector for representing the first condition; and using a condition with a largest weight value as the condition with the highest similarity.

A neural network model is converted by using vectors. For example, all external input data is encoded into vectors for calculation. Therefore, the conditions in the dictionary need to be encoded into vectors and then input into the decoder of the neural network.

Optionally, the determining a weight value of a first condition in the plurality of conditions according to a first vector for representing the source information, a second vector for representing the translated information, and a third vector for representing the first condition includes:

obtaining a weight value $a_t$ of the first condition by using the following formula;

$$a_t = S(Uh_t + Ws_i)$$

$h_t$ representing a vector of a $t^{th}$ condition, $s_i$ representing the first vector and the second vector, S representing an S-shaped growth curve, U and W being matrices, respectively, and the first condition being any one of the plurality of conditions.

The S-shaped growth curve is sigmoid, and the two matrices U and W are multiplied by $h_t$ and $s_i$, respectively, to obtain two numbers, thereby obtaining the weight value of each condition expressed by numbers. The first condition is any one of the plurality of conditions. In this way, different conditions correspond to different weights. Because these weights are obtained through training and calculation, the neural network model will automatically learn conditions that are more important for the current conversion and determine that the current conversion needs higher weights.

With reference to FIG. 4, it may be learned that when the target information $Y_t$ is obtained through conversion, the translated information $Y_{t-1}$, $Y_{t-2}$, . . . , and a plurality of conditions and source information $X_1$, $X_2$, . . . , $X_T$ are also known. It may be learned from the foregoing formula that, a weight $a_t$ of the current condition may be determined according to the second vector of the translated information, the third vector of the current condition, and the first vector of the source information. Then, rule information that is finally obtained is expressed as $c_t = \Sigma\ a_t h_i$. According to weights of all conditions, the condition with the largest weight value may be determined, and the condition $a_{t,T}$ with the largest weight value is used as the current condition to determine the currently translated word $Y_t$.

It may be learned from FIG. 4 that converted target information is determined each time by selecting the condition with the maximum weight value from the plurality of conditions. For example, when "Beijing and Shanghai are related" is converted, when the conversion of "Beijing has a relationship" has been completed, a condition with the maximum weight value is determined as "X and Y have a relationship->X has a relationship with Y" according to a vector of the source information of "Beijing and Shanghai are related", a vector of the translated information "Beijing has a relationship" and a vector of each condition. Based on the condition, the current converted word is "with", and then the next word is converted. According to the vector of the source information of "Beijing and Shanghai are related", the vector of the translated information "Beijing has a relationship", and the vector of each condition, the condition with the maximum weight value is determined as "X and Y are related->X has a relationship with Y", and based on the condition, the current converted word is "Shanghai".

According to this embodiment, since the weight of each condition may be determined according to the currently converted words, source information and conditions, the process of obtaining the weight is a process of automatic training and learning, so that the determined weight is more in line with the needs of the current word conversion. In combination with a corresponding condition, the word is converted into target information, so that the conversion result conforms to the context and field of the source information more accurately.

For a brief description, the method embodiments are represented as a series of actions. However, it is to be appreciated by a person skilled in the art that the embodiments of this application are not limited to the described order of the actions, because some steps may be performed in other orders or simultaneously according to the embodiments of this application. In addition, it is to be understood by a person skilled in the art that the embodiments described in the specification all belong to optional embodiments and the actions and modules are not necessary for this application.

Through the description of the foregoing implementations, a person skilled in the art may clearly understand that the method according to the foregoing embodiments may be implemented by means of software and a necessary general hardware platform, and may also be implemented by hardware, but in many cases, the former manner is a better implementation. Based on such understanding, the technical solutions in the embodiments of this application may be embodied in a form of a software product. The computer software product is stored in a storage medium or non-transitory computer-readable storage medium (e.g., a ROM/RAM, a disk, and an optical disk), including several instructions to enable one terminal device (e.g., a mobile phone, a computer, a server, a network device, or the like) to perform the methods in the embodiments of this application.

Figure 5:
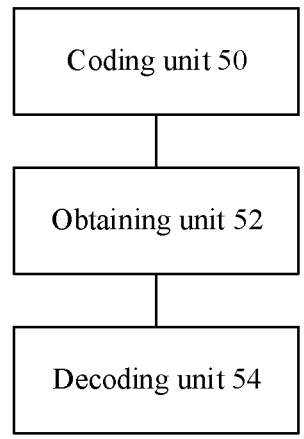
FIG. 5 is a schematic diagram of an information conversion apparatus according to an embodiment of this application.

According to another aspect of the embodiments of this application, an information conversion apparatus for implementing the foregoing information conversion method is further provided. As shown in FIG. 5, the apparatus includes one or more processors (e.g., processing circuitry) and one or more memories storing a program unit, the program unit being executed by the processor and including an encoding unit 50, an obtaining unit 52, and a decoding unit 54.

The encoding unit 50 is configured to encode source information to obtain a first code.

The obtaining unit 52 is configured to obtain a preset conversion condition. The conversion condition can be a mapping relationship between the source information and a conversion result.

The decoding unit 54 is configured to decode the first code according to the source information, the conversion condition, and translated information to obtain target information. The target information and the source information can be information in different languages. The translated information can be a word obtained through conversion of the source information. A language of the translated information can be the same as a language of the target information.

Optionally, the decoding unit includes: a determining module configured to determine a similarity in sentence patterns between a plurality of preset conditions and the source information according to the source information and the translated information; a selection module configured to use a condition with a highest similarity in the plurality of conditions as a conversion condition; and a decoding module configured to decode the first code according to the source information, the conversion condition, and the translated information, to obtain target information.

Optionally, the determining module includes: a weight submodule configured to determine a weight value of a first condition in a plurality of conditions according to a first vector for representing the source information, a second vector for representing the translated information, and a third vector for representing the first condition, the first condition being any one of the plurality of conditions; and a determining submodule configured to use a condition with a largest weight value in the plurality of conditions as the condition with the highest similarity.

Optionally, the weight submodule obtains a weight value $a_t$ of each condition by using the following formula:

$$a_t = S(Uh_t + Ws_i)$$

$h_t$ representing a vector of a $t^{th}$ condition, $s_i$ representing the first vector and the second vector, S representing an S-shaped growth curve, and U and W being matrices, respectively.

Optionally, the obtaining unit includes: an obtaining module configured to obtain a plurality of pieces of preset discontinuous information, the discontinuous information being used for indicating that a phrase includes at least two discontinuous parts with associations.

Optionally, the encoding unit is configured to encode source information by using an encoder of a neural network to obtain a first code, the first code being a first vector. The decoding unit is configured to decode, according to the source information, the conversion condition, and the translated information, the first vector by using the encoder of the neural network, to obtain the target information, the conversion condition being obtained in advance by the encoder of the neural network.

In the embodiment of this application, the source information is converted by adding a conversion condition, the conversion condition can make the machine translation more flexible, and the conversion result is made more accurate through the conversion condition, thereby resolving the technical problem of poor flexibility of information conversion based on a neural network.

Figure 6:
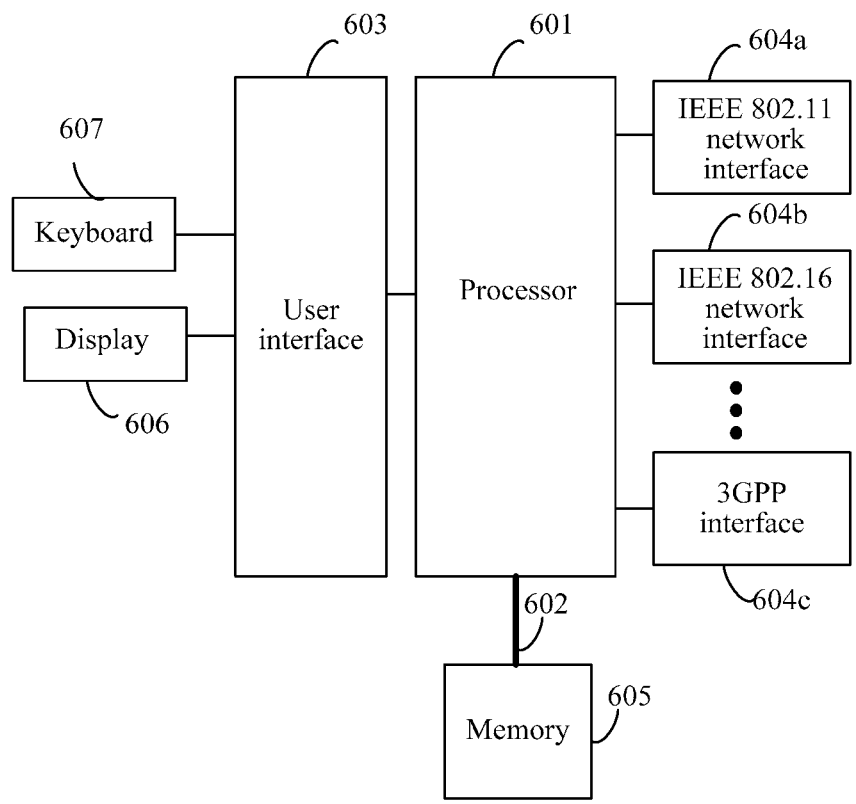
FIG. 6 is a schematic diagram of an electronic device according to an embodiment of this application.

According to still another aspect of the embodiments of this application, an electronic device for implementing the foregoing information conversion method is further provided. The electronic device may be a server or a terminal. As shown in FIG. 6, the electronic device includes a memory and a processor, the memory storing a computer program, and the processor being configured to perform the step in any one of the foregoing method embodiments through the computer program.

Optionally, FIG. 6 is a structural block diagram of an electronic device according to an embodiment of this application. As shown in FIG. 6, the electronic device may include: one or more (only one is shown in the figure) processors 601 (e.g., processing circuitry), at least one communication bus 602, a user interface 603, at least one transmission device (e.g., 604a-604c), and a memory 605. The communication bus 602 is configured to implement a connection for communication between these components. The user interface 603 may include a display 606 and a keyboard 607. The transmission device 604 may optionally include a standard wired interface and a wireless interface.

Optionally, in this embodiment, the foregoing electronic device may be located in at least one of a plurality of network devices of a computer network.

Optionally, in this embodiment, the foregoing processor may be configured to perform the following steps through a computer program.

In a first step, source information is encoded to obtain a first code.

In a second step, a preset conversion condition is obtained. The conversion condition can be a mapping relationship between the source information and a conversion result.

In a third step, the first code is decoded according to the source information, the conversion condition, and translated information to obtain target information. The target information and the source information can be information in different languages. The translated information can be a word obtained through conversion of the source information. A language of the translated information can be the same as a language of the target information.

Optionally, in this embodiment, the foregoing processor may be configured to perform the following steps through a computer program: determining a similarity in sentence patterns between a plurality of preset conditions and the source information according to the source information and the translated information; using a condition with a highest similarity in the plurality of conditions as the conversion condition; and decoding the first code according to the source information, the conversion condition, and the translated information, to obtain the target information.

Optionally, in this embodiment, the foregoing processor may be configured to perform the following steps through a computer program: determining a weight value of a first condition in the plurality of conditions according to a first vector for representing the source information, a second vector for representing the translated information, and a third vector for representing the first condition, the first condition being any one of the plurality of conditions; and using a condition with a largest weight value in the plurality of conditions as the condition with the highest similarity.

Optionally, in this embodiment, the foregoing processor may be configured to perform, through a computer program, obtaining a weight value $a_t$ of each condition by using the following formula;

$$a_t = S(Uh_t + Ws_i)$$

$h_t$ representing a vector of a $t^{th}$ condition, $s_i$ representing the first vector and the second vector, S representing an S-shaped growth curve, and U and W being matrices, respectively.

Optionally, in this embodiment, the foregoing processor may be configured to perform, through a computer program, obtaining a plurality of pieces of preset discontinuous information, the discontinuous information being used for indicating that a phrase includes at least two discontinuous parts with associations.

Optionally, a person of ordinary skill in the art may understand that, the structure shown in FIG. 6 is only exemplary. The electronic apparatus may be a terminal device such as a smartphone (e.g., an Android mobile phone or an iOS mobile phone), a tablet computer, a palmtop computer, a mobile Internet device (MID), or a personal digital assistant (PDA). FIG. 6 is not intended to limit the structure of the foregoing electronic apparatus. For example, the electronic apparatus may further include more or less components (e.g., a network interface and a display apparatus) than those shown in FIG. 6, or have a configuration different from that shown in FIG. 6.

The memory 605 may be configured to store a software program and module, for example, program instructions/modules corresponding to the information conversion method and apparatus in the embodiments of this application. The processor 601 runs the software program and module stored in the memory 605 to implement various functions, applications, and data processing, for example to implement the foregoing information conversion method. The memory 605 may include a high speed random access memory, and may further include a non-volatile memory, for example, one or more magnetic storage apparatuses, a flash memory, or another non-volatile solid-state memory. In some examples, the memory 605 may further include a memory disposed remote to the processor 601, and the remote memory may be connected to the terminal through a network. Examples of the network include but are not limited to, the Internet, an intranet, a local area network, a mobile communications network, and a combination thereof.

The foregoing transmission apparatus (e.g., 604a-604c) is configured to receive or send data through a network. Specific examples of the foregoing network may include a wired network and a wireless network. In an example, the transmission apparatus 604 includes a network interface controller (NIC), which may be connected to another network device and router by using a cable, so as to communicate with the Internet or a local area network. In an example, the transmission apparatus 604 is a radio frequency (RF) module, which communicates with the Internet in a wireless manner.

Specifically, the memory 605 is configured to store information about a preset action condition and a preset permission user, and an application program.

In the embodiment of this application, the source information is converted by adding a conversion condition, the conversion condition can make the machine translation more flexible, and the conversion result is made more accurate through the conversion condition, thereby resolving the technical problem of poor flexibility of information conversion based on a neural network.

According to still another aspect of the embodiments of this application, a storage medium is further provided. The storage medium stores a computer program, the computer program being configured to perform the steps in any one of the foregoing method embodiments.

Optionally, in this embodiment, the foregoing storage medium may be configured to store the computer program configured to perform the following encoding source information to obtain a first code; obtaining a preset conversion condition, the conversion condition being a mapping relationship between the source information and a conversion result; and decoding the first code according to the source information, the conversion condition, and translated information to obtain target information, the target information and the source information being information in different languages, the translated information being a word obtained through conversion of the source information, and a language of the translated information being the same as a language of the target information.

Optionally, in this embodiment, a person of ordinary skill in the art may understand that all or some of the steps in the methods of the foregoing embodiments may be implemented by a program instructing related hardware of a terminal device. The program may be stored in a computer readable storage medium (e.g., a non-transitory computer-readable storage medium). The storage medium may include: a flash drive, a read-only memory (ROM), a random access memory (RAM), a magnetic disk, an optical disc, or the like.

When the integrated unit in the foregoing embodiments is implemented in the form of a software functional unit and sold or used as an independent product, the integrated unit may be stored in the foregoing computer-readable storage medium. Based on such understanding, all or some of the technical solutions may be implemented in a form of a software product. The computer software product is stored in a storage medium and includes several instructions for instructing one or more computer devices (e.g., a personal computer, a server, a network device, or the like) to perform all or some of steps of the methods in the embodiments of this application.

In the foregoing embodiments of this application, descriptions of the embodiments have different emphases, and as for parts that are not described in detail in one embodiment, reference can be made to the relevant descriptions of the other embodiments.

In the several embodiments provided in this application, the disclosed client may be implemented in other manners. For example, the described apparatus embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

The above descriptions are merely exemplary embodiments of this application, and a person of ordinary skill in the art may make various improvements and refinements without departing from the spirit of the embodiments of this application. All such modifications and refinements fall within the protection scope of the embodiments of this application.

INDUSTRIAL APPLICABILITY

In the embodiments of this application, the source information is converted by adding a conversion condition, the conversion condition can make the machine translation more flexible, and the conversion result is made more accurate through the conversion condition, thereby resolving the technical problem of poor flexibility of information conversion based on a neural network.

What is claimed is:

1. An information conversion method for translating source information, comprising:

encoding, by processing circuitry with an encoder of a neural network, the source information to obtain a first code;

obtaining a preset conversion condition of a phrase in the source information from a plurality of preset conversion conditions each representing a different association between words, the preset conversion condition being selected from the plurality of preset conversion conditions based on respective weights indicating similarities between sentence patterns of each of the plurality of preset conversion conditions and a sentence pattern of the source information, wherein each weight of a respective one of the plurality of preset conversion conditions is calculated based on a first vector of the source information, a second vector of previously translated information, and a third vector of the respective preset conversion condition, the selected preset conversion condition having a highest weight among the respective weights of the plurality of preset conversion conditions and defining an association between the words of the phrase in the source information; and decoding, by the processing circuitry with the encoder of the neural network, the first code according to the first vector, the second vector, and the third vector to obtain target information, the target information and the source information being in different languages, and the previously translated information including previously translated words obtained through conversion into a language of the target information.

2. The method according to claim 1, wherein
the decoding the first code includes determining the similarities in the sentence patterns between each of the plurality of preset conversion conditions and the source information according to the source information and the previously translated information; and
the selected preset conversion condition has a highest similarity among the similarities in the sentence patterns with the source information.

3. The method according to claim 1, further comprising determining the weight for each of the plurality of preset conversion conditions by:
obtaining a weight value $a_t$ of each of the plurality of preset conversion conditions based on $a_t=S(Uh_t+Ws_i)$, $h_t$ representing a vector of a $t^{th}$ condition, $s_i$ representing the first vector and the third vector, S representing an S-shaped growth curve, and U and W being matrices, respectively.

4. The method according to claim 1, wherein the obtaining the preset conversion condition comprises:
obtaining a plurality of pieces of preset discontinuous information, the discontinuous information indicating that a phrase includes at least two discontinuous parts with associations.

5. The method according to claim 1, wherein
the first code is the first vector; and
the decoding the first code includes decoding, according to the source information, the preset conversion condition, and the previously translated information, the first vector by using the encoder of the neural network, to obtain the target information, the preset conversion condition being obtained in advance by the encoder of the neural network.

6. The method according to claim 1, wherein the selected preset conversion condition includes a rule for converting a predetermined combination of variables and words in the source information.

7. An information conversion apparatus comprising:
processing circuitry configured to
encode, with an encoder of a neural network, source information to obtain a first code;
obtain a preset conversion condition of a phrase in the source information from a plurality of preset conversion conditions each representing a different association between words, the preset conversion condition being selected from the plurality of preset conversion conditions based on respective weights indicating similarities between sentence patterns of each of the plurality of preset conversion conditions and a sentence pattern of the source information, wherein each weight of a respective one of the plurality of preset conversion conditions is calculated based on a first vector of the source information, a second vector of previously translated information, and a third vector of the respective preset conversion condition, the selected preset conversion condition having a highest weight among the respective weights of the plurality of preset conversion conditions and defining an association between the words of the phrase in the source information; and
decode the first code with the encoder of the neural network according to the first vector, the second vector, and the third vector to obtain target information, the target information and the source information being in different languages, and the previously translated information including previously translated words obtained through conversion into a language of the target information.

8. The apparatus according to claim 7, wherein
the processing circuitry is configured to determine the similarities in the sentence patterns between each of the plurality of preset conversion conditions and the source information according to the source information and the previously translated information; and
the selected preset conversion condition has a highest similarity among the similarities in the sentence patterns with the source information.

9. The apparatus according to claim 7, wherein the processing circuitry is configured to
obtain a weight value $a_t$ of each of the plurality of preset conversion conditions based on $a_t=S(Uh_t+Ws_i)$, $h_t$ representing a vector of a $t^{th}$ condition, $s_i$ representing the first vector and the third vector, S representing an S-shaped growth curve, and U and W being matrices, respectively.

10. The apparatus according to claim 7, wherein the processing circuitry is configured to
obtain a plurality of pieces of preset discontinuous information, the discontinuous information indicating that a phrase includes at least two discontinuous parts with associations.

11. The apparatus according to claim 7, wherein
the first code is the first vector; and
the processing circuitry is configured to decode, according to the source information, the preset conversion condition, and the previously translated information, the first vector by using the encoder of the neural network, to obtain the target information, the preset conversion condition being obtained in advance by the encoder of the neural network.

12. The apparatus according to claim 7, wherein the selected preset conversion condition includes a rule for converting a predetermined combination of variables and words in the source information.

13. A non-transitory computer-readable storage medium storing instructions which when executed by a processor cause the processor to perform:
encoding, with an encoder of a neural network, source information to obtain a first code;
obtaining a preset conversion condition of a phrase in the source information from a plurality of preset conversion conditions each representing a different association between words, the preset conversion condition being selected from the plurality of preset conversion conditions based on respective weights indicating similarities between sentence patterns of each of the plurality of preset conversion conditions and a sentence pattern of the source information, wherein each weight of a respective one of the plurality of preset conversion conditions is calculated based on a first vector of the source information, a second vector of previously translated information, and a third vector of the respective preset conversion condition, the selected preset conversion condition having a highest weight among the respective weights of the plurality of preset conversion conditions and defining an association between the words of the phrase in the source information; and
decoding with the encoder of the neural network the first code according to the first vector, the second vector, and the third vector to obtain target information, the target information and the source information being in different languages, and the previously translated information including previously translated words obtained through conversion into a language of the target information.

14. The non-transitory computer-readable storage medium according to claim 13, wherein
the decoding the first code includes determining the similarities in the sentence patterns between each of the plurality of preset conversion conditions and the source information according to the source information and the previously translated information; and
the selected preset conversion condition has a highest similarity among the similarities in the sentence patterns with the source information.

15. The non-transitory computer-readable storage medium according to claim 13, further comprising determining the weight for each of the plurality of preset conversion conditions by
obtaining a weight value $a_t$ of each of the plurality of preset conversion conditions based on $a_t=S(Uh_t+Ws_i)$, $h_t$ representing a vector of a $t^{th}$ condition, $s_i$ representing the first vector and the third vector, S representing an S-shaped growth curve, and U and W being matrices, respectively.

16. The non-transitory computer-readable storage medium according to claim 13, wherein the obtaining the preset conversion condition comprises:
obtaining a plurality of pieces of preset discontinuous information, the discontinuous information indicating that a phrase includes at least two discontinuous parts with associations.

17. The non-transitory computer-readable storage medium according to claim 13, wherein
the first code is the first vector; and
the decoding the first code includes decoding, according to the source information, the preset conversion condition, and the previously translated information, the first vector by using the encoder of the neural network, to obtain the target information, the preset conversion condition being obtained in advance by the encoder of the neural network.

* * * * *